Oct. 20, 1953          G. B. LOPER          2,656,422

GAIN CONTROL SYSTEM FOR SEISMIC AMPLIFIERS

Filed Oct. 25, 1948          3 Sheets-Sheet 1

George B. Loper
INVENTOR.

BY Sidney A. Johnson
ATTORNEY

Oct. 20, 1953 G. B. LOPER 2,656,422
GAIN CONTROL SYSTEM FOR SEISMIC AMPLIFIERS
Filed Oct. 25, 1948 3 Sheets-Sheet 2

George B. Loper
INVENTOR.

BY *Sidney A. Johnson*

ATTORNEY

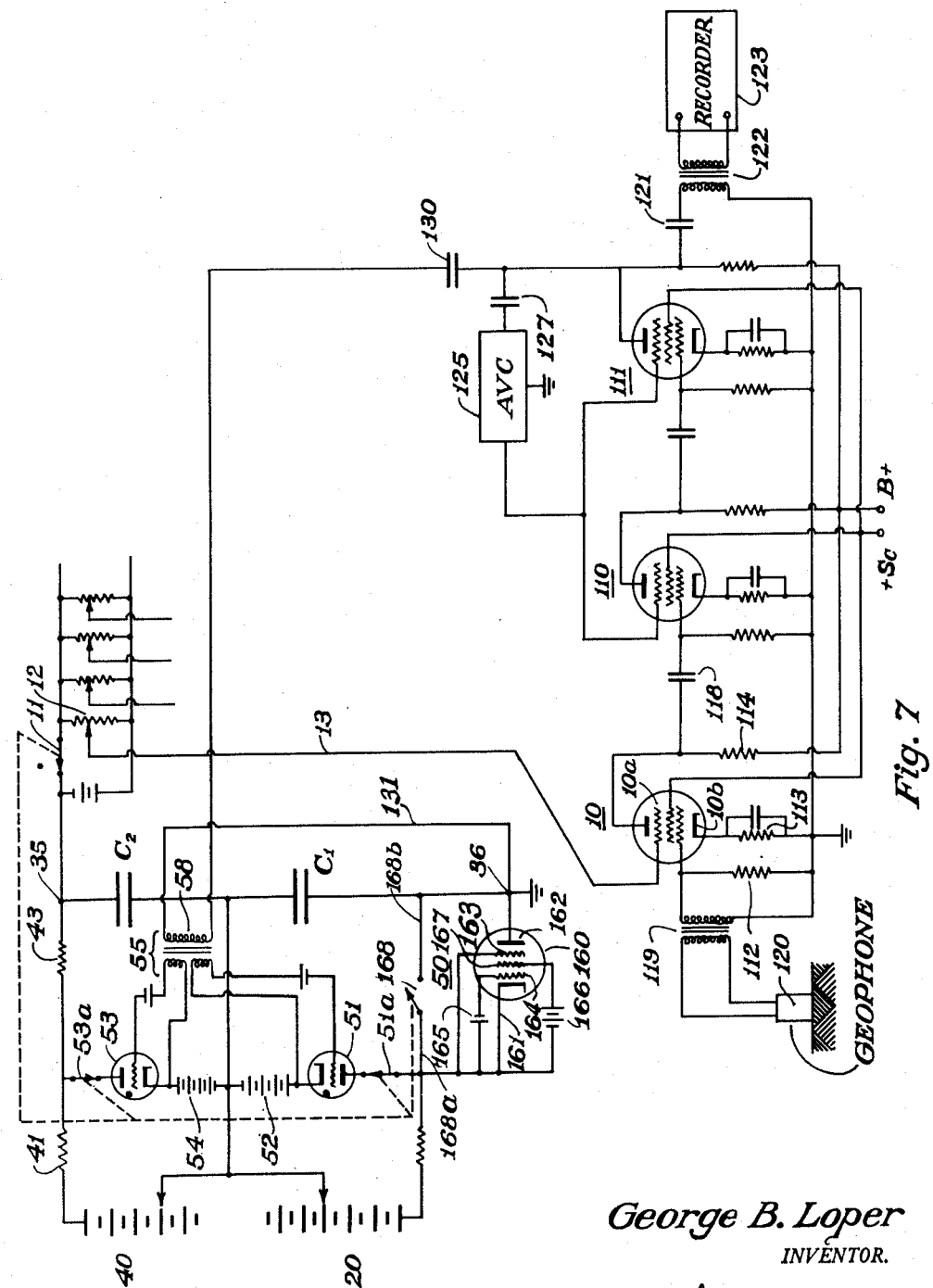

Patented Oct. 20, 1953

2,656,422

UNITED STATES PATENT OFFICE 2,656,422

GAIN CONTROL SYSTEM FOR SEISMIC AMPLIFIERS

George B. Loper, Dallas, Tex., assignor, by mesne assignments, to Socony-Vacuum Oil Company, Incorporated, New York, N. Y., a corporation of New York Application October 25, 1948, Serial No. 56,456

5 Claims. (Cl. 179—171)

1

This invention relates to seismic prospecting and more particularly to a master control system for varying the gain of the seismograph amplifiers as a predetermined function of time.

In seismic prospecting it is customary to detonate a charge of explosives at a point on or near the earth's surface and record electrical impulses produced by a geophone upon reception of seismic waves at selected points spaced from the detonation point. From the data thus obtained, it is possible to determine the depth of the horizons from which the seismic waves have been reflected. Calculation of the depth of the subsurface formations involves the lapsed time from the instant of detonation of the explosive charge to the instant of arrival of reflected waves at the point of detection, the velocities of the various strata encountered in the travel path of the seismic waves, and the geometrical relationship between the points of generation and detection.

With a given spacing between the points of generation and detection, the level of the energy received following the detonation of the explosive charge varies, depending upon the elastic constants of the formations in the travel path of the waves from the point of generation to the point of reception. The variation in energy level as a function of time may approximate an exponential curve. In a given area the variation in level depends upon the spread configuration or spacing between the points of generation and reception of the seismic waves. If seismic detectors are positioned closely adjacent the point of generation, there is a rapid transition from high energy level direct waves and shallow reflected waves following the instant of generation to relatively low level waves reflected from deeper horizons. If the spacing is made large between the receptor and the initiation point, the level of the initial waves may not exceed the level of later reflected waves by a factor of more than 3 or 4. For very close spacing (50 to 500 feet) the ratio may exceed 1,000. If the spread configuration is maintained constant and moved from one area to another, the attenuation of the seismic signals varies with time in a manner determined by the underlying formations.

It is general practice to record signals detected at a plurality of points following the detonation of the explosive charge. The signals from the geophones or detectors are amplified and subsequently recorded as traces or undulating lines on a photographic strip. In order to delineate or to interpret the record, it is necessary that each of the traces be recorded at a substantially constant average amplitude with the maximum thereof limited so that the adjacent traces do not overlap to such an extent that one trace may not be distinguished from the others.

Various methods and devices have been utilized to control the amplitude of the record traces. Master gain-control systems associated with the amplifiers have been utilized to vary the amplifier gain. Automatic volume control systems producing a voltage dependent upon the amplitude of the output signal of each amplifier also have been utilized in an attempt to maintain the average trace amplitude constant. Most satisfactory results ordinarily are obtained with a system which combines automatic volume control individually responsive to the output of each amplifier, and a master control system connected to all amplifiers. In such systems the master control compensates for the general or long period variation of the signal amplitude, the automatic volume control functions to compensate for minor or short period variations.

The system of the present invention is designed to produce a master control voltage which may be made to vary with time following the initiation of the seismic waves to match the attenuation or decay characteristic of the seismic event under widely varying spread configurations or in different areas having contrasting elastic constants. The invention, in one form thereof, comprises two condensers connected in series and in circuit with the grid-cathode impedance of one or more tubes in each of the seismic amplifying channels. A source of potential is utilized to charge each of the condensers to a predetermined maximum value. Normally non-conductive paths in circuit with each of the condensers, when rendered conductive upon detonation of the explosive, permit the accumulated charges to flow from the condensers, causing variation with time of the potential across them. The sum of the voltages across the two series condensers applied to the control grids of the amplifiers is effective in changing the gain thereof. The time constants of the discharge paths are variable. In one form of the invention, a constant current device in the discharge path of one of the condensers causes variation in voltage linear with respect to time.

Though the circuit arrangement requires relatively few components, the amplifier gain may be changed inversely as the average amplitude of the seismic waves decreases following detonation of the explosive charge.

For a more detailed explanation of the invention and for further objects and advantages thereof, reference may now be had to the following description taken in conjunction with the accompanying drawings, in which.

Figure 4:
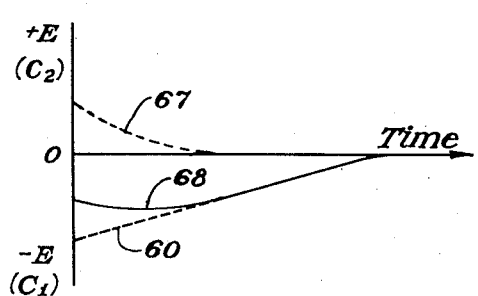
Figure 5:
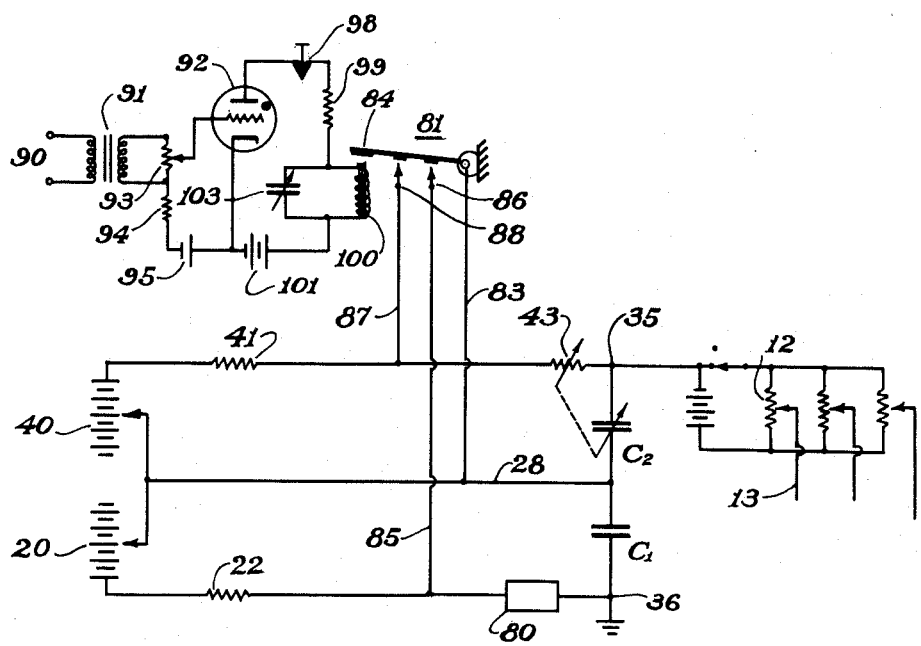
Figure 6:
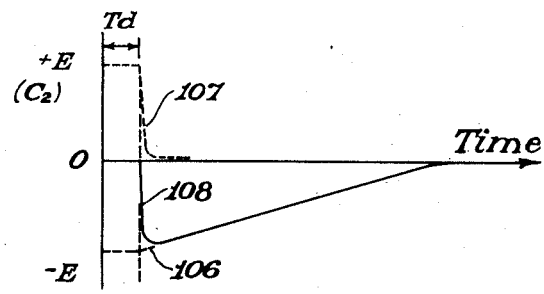

Fig. 4 graphically illustrates a modified expander-contractor action;

Fig. 5 is a modified form of a master control system;

Fig. 6 illustrates a further control voltage function, and

Figure 1:
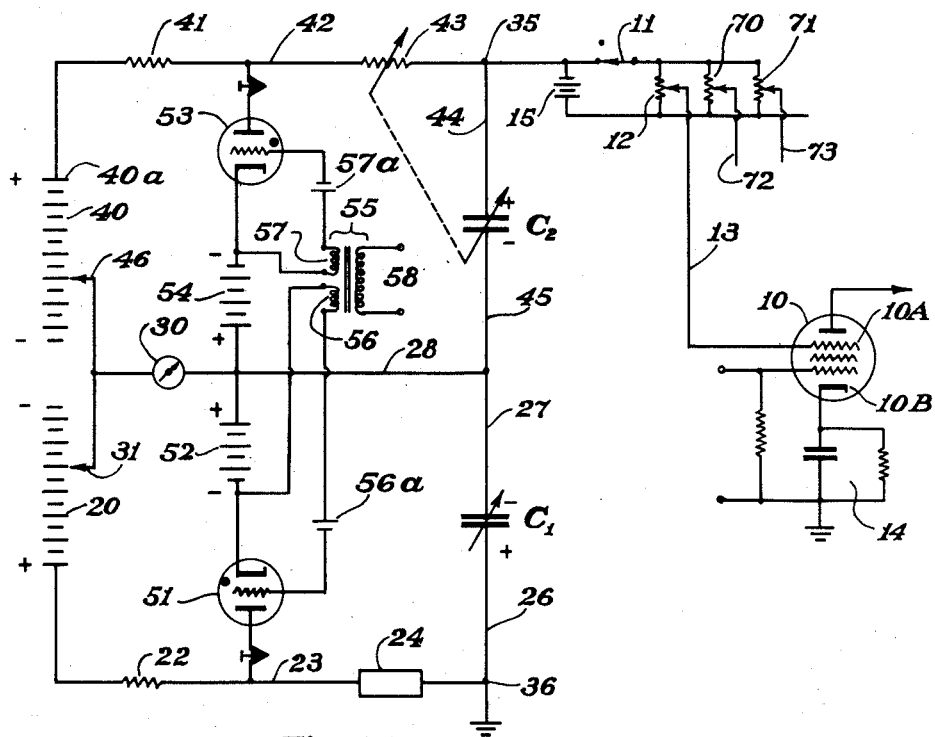
Fig. 1 is a schematic diagram of a master control system embodying the present invention.

Fig. 7 schematically illustrates the master control system of Fig. 1 applied to a seismograph amplifying channel.

Referring now to Fig. 1, there has been illustrated a master gain-control system which includes condensers $C_1$ and $C_2$. The condensers are connected in series and in circuit with the suppressor grid-cathode impedance of an amplifier tube 10. The circuit includes switch 11, potentiometer 12 and conductor 13 which is connected to the suppressor grid 10a of tube 10. The circuit is completed through cathode 10b and a cathode biasing circuit 14 to ground. The sum of the voltages across condensers $C_1$ and $C_2$ is applied to the suppressor grid 10a of the tube 10. In order to compensate for minor variations in the gain of individual detecting-amplifying channels, a bias battery 15 is placed in circuit with the resistor 12. A portion of the bias voltage, depending upon the position of the variable tap, is added to the sum of the voltages across condensers $C_1$ and $C_2$ and applied to the grid 10a of the tube 10.

In one form of the invention a source of potential 20 connected in circuit with condenser $C_1$ is utilized to charge condenser $C_1$ to a voltage of predetermined magnitude. The charging circuit includes resistor 22, conductor 23, a constant current device 24, conductor 26, condenser $C_1$, conductors 27 and 28, ammeter 30 and battery tap 31.

In a similar manner a source of potential 40 is utilized to charge condenser $C_2$ to a predetermined voltage through a circuit which includes resistor 41, conductor 42, potentiometer 43, conductor 44, condenser $C_2$, conductors 45 and 28, ammeter 30 and battery tap 46.

It will be observed that batteries 20 and 40 are connected opposite in polarity and, thus, charge the condensers $C_1$ and $C_2$ in opposite senses with respect to the output point 35 and the ground point 36. More particularly, condenser $C_1$ will be charged with the grounded terminal positive and the upper terminal negative, while the condenser $C_2$ is charged with the lower terminal negative and the upper terminal positive.

Separate discharge pads are provided for condensers $C_1$ and $C_2$. The discharge path for condenser $C_1$ includes the impedance device 24 which, in one form, may be a constant current circuit, conductor 23, gas triode or thyratron 51, battery 52 and conductors 26 and 27. The discharge path for condenser $C_2$ includes conductor 44, potentiometer 43, conductor 42, thyratron 53, battery 54 and conductors 28 and 45. The thyratrons 51 and 53 in the discharge paths of condenser $C_1$ and $C_2$, respectively, are normally non-conductive by reason of a negative bias applied to the control grids of the thyratrons. More particularly, the grid of thyratron 51 is connected in a circuit which includes transformer secondary winding 56 and bias battery 56a. The grid of thyratron 53 likewise is included in circuit with transformer secondary 57 and bias battery 57a. As is classic in the operation of thyratrons, the tube will remain non-conductive until the grid potential is raised sufficiently to allow the thyratron to fire. Upon detonation of the exposive charge, triodes 51 and 53 are rendered conductive, allowing the condensers $C_1$ and $C_2$ to discharge. More particularly, a voltage pulse from a blaster (not shown) or otherwise produced in timed relation with the initiation of seismic waves, is applied through transformer 55 to the grids of thyratrons 51 and 53.

The batteries 52 and 54 are preferably chosen as to substantially equal the voltage drop across the thyratrons 51 and 53 when conducting. When such is the case the potential across, for instance, battery 52 is equal and opposite in polarity to the drop across the thyratron 51, and the net voltage between the point 35 and the common juncture between battery 52 and 54 will depend only upon the charge on condenser $C_2$.

When the tube 51 is fired, condenser $C_1$ discharges through the device 24 which, for the purposes of the following explanation, and as will hereinafter be more fully described, operates in such a manner that the flow of current from condenser $C_1$, is constant and not an exponential function as would be the case if device 24 were a fixed resistance. Thus, the variation of voltage across condenser $C_1$ as a function of time will be substantially linear, due to the action of the constant current device 24. In contrast, the variation of the potential across condenser $C_2$ will be an exponential curve, the shape of which depends upon the size of the resistor 43 and the size of the condenser $C_2$. Condenser $C_2$ and resistor 43 are preferably variable so that the time constant of the discharge circuit for condenser $C_2$ may be varied to suit the particular requirements. By mechanically simultaneously adjusting them, a wide range of control is provided.

To simplify the description of operation it will first be assumed that no voltage is applied to condenser $C_2$ (battery tap 46 is positioned at the end 40a of the battery 40). The initial voltage $E_{35-36}$ and thus the voltage across condenser $C_1$ is determined by the position of the tap 31 on battery 20. This voltage initially biases the suppressor grid 10a of the tube 10 negative with respect to ground. The value of the voltage used will depend upon the amount of initial suppression desired.

Figure 2:
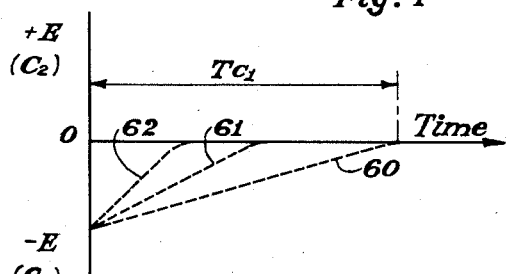
Fig. 2 illustrates one control voltage function obtained with the control circuit of Fig. 1.

The variation of the voltage from $C_1$ as a function of time following detonation of the explosive will be substantially linear as illustrated by the dotted line 60 of Fig. 2 which is a graph of the variation in voltage $E_{35-36}$ following detonation. By varying the capacity of the condenser $C_1$ the curve 60 may be modified to produce a control voltage illustrated by curves 61 and 62, Fig. 2. For an intermediate value or size of $C_1$, curve 61 may be taken as illustrative of the variation in $E_{35-36}$ and for a small condenser or low value of capacitance for $C_1$, curve 62 illustrates the operation.

For an explanation of operations of the circuit of Fig. 1, which includes features in addition to those above described, assume that the charging voltage from source 20 and the size of condenser $C_1$ remain constant. In such case, for each operation, a voltage function as illustrated by curve 60 will be obtained from condenser $C_1$. That voltage function will then be modified by the action of condenser $C_2$ and its circuit to produce an output control voltage $E_{35-36}$ which may satisfy the requirements under varied operating conditions.

For example, if it is desired to record the first arriving energy or the "first break" at a high amplifier gain and thereafter abruptly to reduce the gain to record reflected energy at an optimum amplitude, the grid $10a$ of tube 10 will be initially at substantially ground potential. To effect such operation, the tap 46 will be positioned at the same potential with respect to the positive side of battery 40 as tap 31 with respect to the positive side of the battery 20, thus charging condenser $C_2$ to the same potential and opposite in polarity with the potential of condenser $C_1$. At the instant the explosive charge is detonated, the potential $E_{35-36}$ is zero. If the time constant of $C_2-R_{43}$ is relatively small, condenser $C_2$ will discharge as illustrated by curve 65 of Fig. 3. The output voltage $E_{35-36}$ across condensers $C_1$ and $C_2$ applied to the suppressor grid $10a$ following detonation, illustrated by solid line 66, is equal to the algebraic sum of the curve 60 and curve 65 of Fig. 3. Thus, the suppressor grid $10a$, initially at ground potential for maximum gain, is made negative shortly after the detonation of the explosive to reduce the gain to such a low value that the high amplitude shallow reflections may be recorded with minimized overlapping of adjacent traces. Thereafter, the gain control voltage decreases to increase the gain in compensation of the attenuation of later arriving reflections.

When it is desired to maintain the suppressor grid $10a$ of tube 10 at a relatively constant potential and negative with respect to ground for a given period following detonation of the explosive charge, battery tap 46 may be so adjusted that the algebraic sum of the effective voltages from batteries 20 and 40 will substantially equal the desired negative potential for the suppressor grid $10a$ of tube 10. The time constant of $C_2-R_{43}$ is adjusted to permit substantial discharge of condenser $C_2$ by the time expansion of the amplifier gain is desired. As illustrated in Fig. 4, curve 60, modified by the discharge curve 67 of condenser $C_2$, effects an output or a total voltage curve 68.

The foregoing discussion and the illustrated curves obtained using the master control of the present invention indicate the wide variety of control functions which may be obtained. By varying condensers $C_1$, $C_2$, resistor 43 and the battery taps 31 and 46, control curves of various desired shapes may be had within wide limits.

Since, after being rendered conductive, the grid control of the thyratrons 51 and 53 is lost, push-button switches inserted in their plate circuits may be opened to extinguish or to render non-conductive the tubes 51 and 53. Thereafter, the condensers $C_1$ and $C_2$ will charge to a new value preparatory to the detonation of a second or succeeding charges. The potentiometers 70, 71 and others not shown are connected through conductors 72, 73, etc., to amplifiers other than that including tube 10, effectively to control the gain of a plurality of amplifiers from the single master control.

In Fig. 5 there is disclosed a modification of the master control circuit of Fig. 1 in which a mechanical relay is utilized to complete or to render conductive the discharge circuits for condensers $C_1$ and $C_2$. In this circuit, as in the circuit of Fig. 1, condensers $C_1$ and $C_2$ are in series. The voltage $E_{35-36}$ is, through potentiometer 12 and conductor 13, applied to a selected gain-control grid in one of the seismograph amplifiers. Battery 20, in circuit with condenser $C_1$, impedance device 80 and resistor 22 charges condenser $C_1$ to the desired control potential. Battery 40 in circuit with condenser $C_2$, variable resistor 43 and resistor 41 charges condenser $C_2$ to a desired potential, opposite in polarity to that on condenser $C_1$.

Closure of an electromagnetic relay 81 provides a low impedance or short-circuit discharge path for condensers $C_1$ and $C_2$ in series with the impedance device 80 and variable resistor 43 respectively. More particularly, the common juncture between condensers $C_1$ and $C_2$ is connected through conductors 28 and 33 to the armature 84 of the relay 81. Conductor 85, connected to the juncture of impedance device 80 and resistor 22, is terminated at contact 86 of the relay 81 which, upon closure, completes a discharge path for condenser $C_1$. Similarly, conductor 87 connected to the juncture of resistors 41 and 43 is terminated at a second contact 88 of the relay 81. Closure of relay 81 also closes the discharge circuit for condenser $C_2$.

The relay energizing circuit is so designed that the closure of the discharge circuits may be delayed for a desired period of time following detonation of the explosive charge. The input terminals 90 of the input transformer 91 are preferably connected to the blaster, or are otherwise connected to a circuit which applies a voltage pulse in synchronism or in predetermined timed relation with the detonation of the explosive charge. The transformer output is applied to the grid of thyratron 92. The grid-cathode circuit of the thyratron 92 includes the control potentiometer 93 connected across the secondary of transformer 91. The adjustable tap of potentiometer 93 is connected directly to the grid of the tube 92. The grid circuit further includes a resistor 94 in series with bias battery 95 and the cathode of the tube 92. The biasing battery 95 serves the function of maintaining the thyratron 92 non-conductive. An impulse of sufficient magnitude applied to the input 90 of the transformer 91 will drive the grid potential in a positive direction sufficient to fire the thyratron 92.

The plate circuit of the thyratron includes a switch 98, a load resistor 99, the actuating coil 100 of the relay 81, and a supply battery 101. A condenser 103 is connected in parallel with the winding or actuating coil 100 of the relay 81. By providing the condenser 103 of variable capacity, the time at which the relay 81 closes the discharge circuits of condensers $C_1$ and $C_2$ following the firing of the thyratron 92 may be controlled. If the condenser 103 and the coil 100 are properly chosen, delays in the range of from .1 to .5 second or more may be introduced to delay closure of relay 81. Thus, the time delay $T_d$, Fig. 6, may be varied at the will of an operator. By providing such delay, a contraction-expansion action such as illustrated in Fig. 6 may be obtained.

The curve 106 illustrates the variation of the voltage across condenser $C_1$ as a function of time following the detonation of the explosive charge. The curve 107, obtained with a short time constant for the circuit including resistor 43 and condenser $C_2$, illustrates the variation of the voltage across condenser $C_2$ following the detonation. The algebraic sum of the two voltages (curves 106 and 107) represents the control voltage $E_{35-36}$ applied through conductor 13 to a suppressor grid of one of the amplifier tubes. The effective control curve is illustrated as the unbroken line or curve 108.

Figure 3:
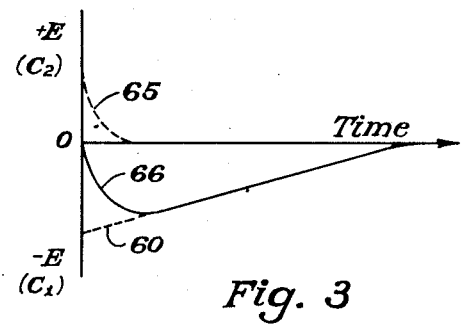
Fig. 3 illustrates variations of the control voltage function of Fig. 1.

It is evident that the control voltage function illustrated in Fig. 6 may be modified in a manner similar to the modifications of the curve 60 of Fig. 2, as illustrated in Figs 2–4. The addition of the time delay provides an expander-contractor action where a time delay of more than a few tenths of a second may be desired, and may be used in instances where the modified contractor-expander action illustrated in Fig. 3 is not adequate.

In Fig. 7 the master control circuit of Fig. 1 has been illustrated as applied to a seismograph amplifying channel. Parts corresponding with those in Fig. 1 have been given the same reference characters.

The amplifying channel comprises three stages including tubes 10, 110 and 111. As illustrated, the tubes are of the pentode type, each having a control grid, screen grid and pentode grid respectively spaced between cathode and plate thereof. Each of the stages includes a grid resistor 112, cathode biasing circuit 113, and a plate resistor 114. The screen grids are interconnected and supplied from a source of potential +Sc. The plates of the tubes likewise are supplied from a source of B+ potential. Coupling condensers 118 are provided intermediate each stage.

A seismic detector or geophone 120 positioned on the ground and spaced from the point of detonation of the explosive charge generates electrical impulses in sympathy with seismic waves. The geophone is connected to an input transformer 119, the secondary of which is connected to the control grid of tube 10. The signal is amplified at tube 10, subsequently at tubes 110 and 111. The output of tube 111 is connected through condenser 121 to an output transformer 122 which, in turn, is connected to a multi-element recorder 123. As is well understood, in a given seismic surveying operation there will be a plurality of geophones such as geophone 120, a corresponding number of amplifying channels such as the channel comprising tubes 10, 110 and 111, each of the channels being connected to the multi-element recorder 123. The recorder produces an oscillographic record having a plurality of traces, each representative of the seismic waves received at the respective detecting stations.

Further, and as above indicated, for the best results automatic volume control is used in conjunction with the master control. The A. V. C. unit 125 is coupled to the output of the tube 111 through condenser 127. The output of the A. V. C. circuit 125 is then connected to the suppressor grids of tubes 110 and 111. The A. V. C. voltage applied to tubes 110 and 111 may be derived through a circuit such as disclosed in Patent 2,306,991 to Groenendyke. The response or the time constant of the A. V. C. circuit is preferably in the order of one-tenth of a second, in which case minor variations in the average level of the signal impinging the geophone 120 will be compensated for.

Further, and in accordance with the present invention, the output of the master control circuit is applied to the suppressor grid of the first tube, tube 10, of the amplifier channel. As illustrated, conductor 13, connected to potentiometer 12, applies the master control voltage $E_{35-36}$ to the suppressor grid 10a of tube 10. With such circuit arrangement the gain of the amplifying channel may be made to vary as any of the curves illustrated in Figs. 2–4. If the master control of Fig. 5 is utilized, any of the control curves of Figs. 2–4 and 6 may be obtained. The primary of the transformer 55, Fig. 7, is connected to the output of the amplifier, one terminal of the primary 58 being connected to the plate of tube 111 through coupling condenser 130. The other terminal of the primary 58 of transformer 55 is connected through conductor 131 to the ground point 36.

The device 50 for maintaining the current from condenser $C_1$ constant following energization of thyratron 51 has been illustrated in detail in Fig. 7, and comprises a pentode 160, the plate-cathode resistance of which is in series with condenser $C_1$ and thyratron 51. More particularly, the cathode 161 is connected to the plate of thyratron 51 and the plate 162 is connected to the grounded terminal of condenser $C_1$. The suppressor grid 163 is at cathode potential and the control grid 164 is maintained negative by battery 165. Battery 166 connected between the screen grid 167 and cathode 161 is chosen so that the current from condenser $C_1$ will be essentially constant. By properly choosing the operating point for the tube 160 the flat $E_p$–$I_p$ characteristic curve of the pentode may be utilized to maintain a constant current flow of, for example, approximately 100 microamperes from condenser $C_1$ over a wide range of plate voltages. Such use of the flat $E_p$–$I_p$ curve means that as the voltage across condenser $C_1$ decreases the impedance of device 50 also decreases and by an amount which keeps constant the discharge current of condenser $C_1$. Switches 51a and 53a in the plate circuits of thyratrons 51 and 53, respectively, are mechanically coupled to the switch 168 in a line comprising conductors 168a and 168b. When switch 168 is closed the constant current device 50 is by-passed. In operation, with the condensers $C_1$ and $C_2$ charged to a desired voltage, switches 51a and 53a closed and switch 168 open, energization of the thyratrons 51 and 53 causes discharge of the condensers $C_1$ and $C_2$ through their respective discharge circuits. When the recording period has been completed, actuation of the switches 51a, 53a and 168 simultaneously renders the triodes 51 and 53 non-conductive and closes the path in shunt with the constant current device 50 to permit condenser $C_1$ to be recharged.

Assuming, Fig. 7, that the charging potentials on condensers $C_1$ and $C_2$ are equal and opposite, as illustrated in Fig. 3, the first impulses or first break energy impinge upon the geophone 120, pass through the amplifying channel, and are recorded on one of the galvanometer traces of recorder 123 with the amplifier at full gain. Upon passage of the first impulse through the plate circuit of the tube 111 the impulse is applied by way of condenser 130 to the master control circuit, firing the thyratrons 51 and 53, thus initiating the master control action which, upon the rapid discharge of condenser $C_2$, such as illustrated by curve 65 of Fig. 3 or curve 107 of Fig. 6, effects rapid application of a high negative suppressor grid voltage abruptly to reduce the amplifier gain to the desired level. Thereafter, the gain of the amplifier is dependent upon the variation of the voltage across condenser $C_1$.

By way of explanation, and in no way intended as a limitation, a circuit having the following components and circuit constants may be taken as typical. The thyratrons 51 and 53 may be of the type 2050. The cathode plate drop of this thyratron is approximately 8 volts when conductive. Accordingly, and in accordance with the present invention, batteries 52 and 54 may conveniently be 7½ volts. In the application to which the control circuit was utilized the tube 10 was a pentode such as a 6J7. The batteries 20 and 40 were chosen to permit application of voltages to the suppressor grid of tube 10 sufficient to cause operation near plate current cut-off. In one embodiment of the circuit the batteries 20 and 40 were 22½ volts. The condensers $C_1$, $C_2$, and resistor $R_{43}$, and the constants of the constant current device 50 may be chosen in accordance with well-known principles to produce discharge of the condensers in times suitable for specific applications. Generally speaking, the time constant of the circuit comprising condenser $C_1$ and device 50 would be of the order of two seconds for a reflection seismograph, while the time constant of the circuit including condenser $C_2$ and resistor $R_{43}$ would be variable between 0 and 1 second. Though the constant current device 50 has been included in the description of the invention, a fixed resistance may be utilized in place thereof, if it is desired to have the long-time expansion curve (curve 60, Figs. 2-4) exponential in shape.

Though the invention has been illustrated by several modifications thereof, it is understood that further modifications within the scope of the appended claims may now suggest themselves to those skilled in the art.

What is claimed is:

1. A gain control for an amplifier for seismic prospecting where the average amplitude of seismic waves received at a recording station decreases as a function of time, comprising a gain controlling circuit for said amplifier having therein a pair of series-connected condensers, a separate charging circuit for each of said condensers for respectively charging them to voltages of predetermined magnitude and of opposite polarity, a normally open discharge circuit for each of said condensers, one of said discharge circuits including means for maintaining uniform the value of the discharge current, and means operable in timed relation with the initiation of the seismic waves for completing said discharge circuits for controlled variation of the sum of the voltages of said condensers for varying the gain of said amplifier.

2. In seismic prospecting where the average amplitude of seismic waves received at a recording system decreases as a function of time, the combination of a seismic amplifier having a gain-controlling circuit, a pair of condensers associated with said gain-controlling circuit of said amplifier to compensate for said decrease in amplitude, means for charging said condensers to voltages of predetermined magnitude of opposite polarity, a circuit applying the algebraic sum of said voltages to said gain-controlling circuit, means including a discharge circuit and an impedance device whose impedance decreases with a decreasing voltage applied to it connected in said discharge circuit for discharging one of said condensers uniformly with respect to time, and means including a second discharge circuit and a constant impedance device for discharging the other of said condensers exponentially with respect to time following the initiation of said seismic waves to vary the gain of said amplifier during reception of said waves proportional to the instantaneous sum of said voltages.

3. A system including a vacuum tube amplifier for seismic signals and a control circuit for varying with time the gain of said amplifier, comprising a condenser having one terminal connected to a grid of said amplifier, a second condenser having one terminal connected to a cathode of said amplifier, the remaining terminals of said condensers being connected together, circuit means including sources of potential independently to charge said condensers to predetermined voltages of opposite polarity in said control circuit, a normally non-conductive discharge circuit for each of said condensers, means responsive to the signal output of said amplifier for rendering both of said discharge paths conductive, a constant current device in said discharge circuit with one of said condensers for producing linear discharge thereof with respect to time, and resistance means in said discharge circuit of the other of said condensers for producing exponential discharge thereof with respect to time, the gain of said amplifier varying with change in the algebraic sum of the voltages across said condensers.

4. A system including a vacuum tube amplifier for seismic signals and a control circuit for varying with time the gain of said amplifier, comprising a condenser having one terminal connected to a grid of said amplifier, a second condenser having one terminal connected to a cathode of said amplifier, the remaining terminals of said condensers being connected together, circuit means including sources of potential independently to charge said condensers to predetermined voltages of opposite polarity in said control circuit, a normally non-conductive discharge circuit for each of said condensers, means actuated in timed relation with the initiation of seismic waves for rendering both of said discharge paths conductive, a constant current device in said discharge circuit with one of said condensers for producing linear discharge thereof with respect to time, and resistance means in said discharge circuit of the other of said condensers for producing exponential discharge thereof with respect to time, the gain of said amplifier varying with change in the algebraic sum of the voltages across said condensers.

5. In seismic prospecting where the average amplitude of the seismic waves received at a recording system decreases as a function of time, the combination of a seismic amplifier having a gain-controlling circuit, a pair of condensers associated with said gain-controlling circuit of said amplifier, a separate direct-current source of supply for each of said condensers, charging circuits each including one of said sources of supply for charging said condensers to voltages of predetermined magnitude of opposite polarity, said condensers being associated with said gain-controlling circuit for application thereto of the algebraic sum of said voltages for controlling the gain of said amplifier, a normally non-conductive discharge circuit for each of said condensers, means actuated in timed relation with the initiation of said seismic waves for rendering conductive said normally non-conductive discharge circuits, one of said discharge circuits having values of resistance and capacitance materially differing from the resistance and capacitance of the other of said discharge circuits for discharge of one of said condensers during a time interval materially differing from that of the other of said condensers whereby the gain of said amplifier may be made to decrease over one of said time intervals and to increase over a substantial part of the other of said time intervals.

GEORGE B. LOPER.

References Cited in the file of this patent

UNITED STATES PATENTS

| Number | Name | Date |
|---|---|---|
| 1,752,228 | Brillouin | Mar. 25, 1930 |
| 2,024,838 | Stansbury | Dec. 17, 1935 |
| 2,214,608 | Bull | Sept. 10, 1940 |
| 2,250,559 | Weber | July 29, 1941 |
| 2,354,420 | Minton | July 25, 1944 |
| 2,375,283 | Cloud | May 8, 1945 |
| 2,404,160 | Boucke | July 16, 1946 |
| 2,410,303 | Petty | Oct. 29, 1946 |